Sept. 23, 1952     D. R. BIGGERT ET AL     2,611,466
COMBINED LADDER AND EXTENSIBLE
LOADING RAMP FOR PLATFORMS
Filed April 6, 1948
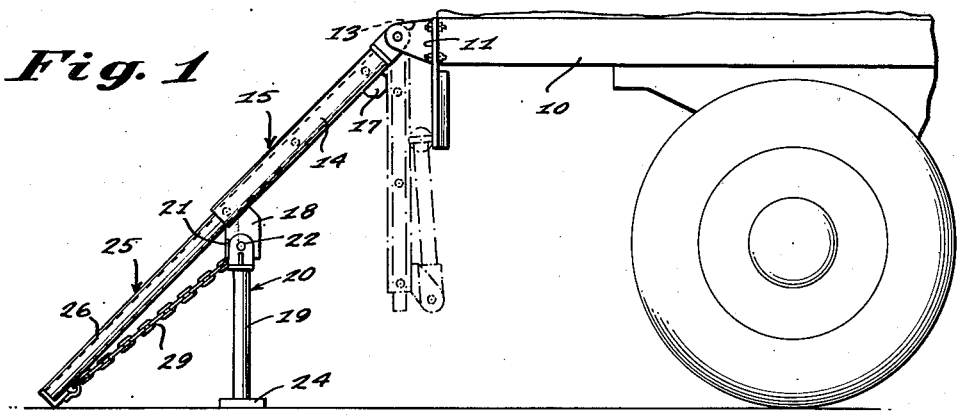
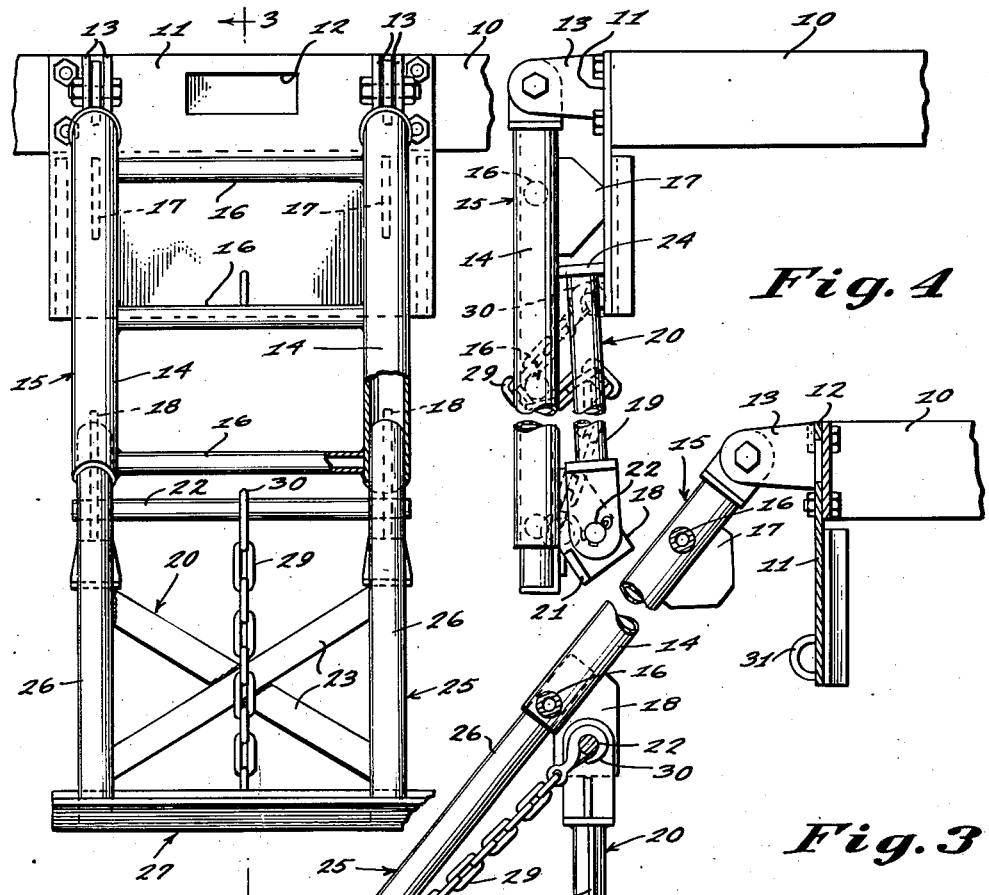
INVENTORS
DON R. BIGGERT &
HERBERT P. GOEDICKE
BY
McMorrow, Berman & Davidson
ATTORNEYS Patented Sept. 23, 1952

2,611,466

UNITED STATES PATENT OFFICE 2,611,466

COMBINED LADDER AND EXTENSIBLE LOADING RAMP FOR PLATFORMS

Don R. Biggert and Herbert P. Goedicke, Marion, Ohio

Application April 6, 1948, Serial No. 19,408

2 Claims. (Cl. 193—41)

Our invention relates to loading ramps for platforms, and while not so limited is particularly applicable to loading ramps for the platforms of vehicles, such as trucks, truck trailers, railroad cars and the like. As is well known, the freight-supporting platform of such vehicles is located a considerable distance above the ground, wherefore not only is a ramp frequently required for the loading and unloading of goods, but a ladder or step is frequently required to enable the handler of such goods to enter the vehicle from the ground.

With the foregoing in view, it is an object of our invention to provide an improved ramp for a platform.

A further object is to provide an improved combined ladder and ramp for a platform.

A further object is to provide an improved ramp for a platform which includes a pair of extensible sections movable relatively to each other to and from extended and retracted positions, and a brace means for bracing an intermediate portion of the ramp sections when the same are in the extended position.

A further object is to provide an improved ramp for platforms which includes a pair of extensible sections movable to and from extended and retracted positions, and wherein one of the sections is formed to provide a ladder.

A further object is to provide a novel ramp for platforms which includes an upper section adapted to be pivotally secured to a platform and formed to provide a combined ramp and ladder, a lower section extensibly connected to the upper section for movement to and from an extended and retracted position, a brace for the ramp pivotally carried by said upper section and movable to and from a ramp-bracing position and a retracted position, and a flexible member detachably carried by said upper section and connecting the same to the lower section to limit movement of the ladder in an extending direction, said flexible member being adapted to be engageable with the platform to lock all of said sections and said brace in the retracted positions.

Other objects and advantages reside in the particular structure of the invention, the structure of the several elements comprising the same, combination and relation of the several elements, and will be readily understood by those skilled in the art upon reference to the attached drawing in connection with the following specification, wherein the invention is shown, described and claimed.

In the drawing:

Figure 1 is an elevational view showing the ramp according to our invention in operative association with a platform, the platform being shown diagrammatically;

Figure 2 is an enlarged elevational view looking from the left of Figure 1;

Figure 3 is a longitudinal vertical sectional view taken substantially on the plane of the line 3—3 of Figure 2, with parts being broken away;

Figure 4 is an enlarged elevational view like Figure 1, but showing the parts in the retracted position, and parts being broken away.

Referring specifically to the drawing, wherein like reference characters have been used throughout the several views to designate like parts, 10 designates generally any suitable platform for the support of goods in elevated relation to the ground. In the embodiment shown, the platform 10 comprises the floor of a motor vehicle, such as a truck, trailer or semi-trailer. However, it should be understood that the platform 10 may be stationary or may comprise the floor of a railway car or other vehicle. A plate 11 is secured to the end edge of the platform 10 in pendent relation thereto and may be formed with a suitable central recess 12 therein for the reception of the latches of the doors for the platform which are not shown, but which would be present in the event that the platform 10 was the floor of a vehicle.

Laterally-spaced pairs of ears 13 are fixed to the plate 11 and extend rearwardly thereof to provide means for pivotally connecting to the plate the upper ends of a pair of tubular members 14 comprising an upper ramp section 15. The members 14 are spanned by transverse rungs 16 whereby to provide a ladder. The upper portions of the members 14 are formed with rearwardly-directed stop members 17 which engage the forward surface of the lower portion of the plate 11 to limit rearward pivotal movement of the section 15, whereby the same in the retracted position is retained in spaced parallel relation to the plate 11, for a purpose to be apparent later. The lower ends of the members 14 of the upper section 15 are provided with a pair of depending lugs 18 to which are pivotally secured in any suitable manner a pair of spaced and parallel bars 19 comprising a brace 20. Each of the lugs 18 includes a laterally-directed limit stop 21, Figures 1 and 4, which is engageable with an upper portion of each brace bar 19 to limit the pivotal movement thereof in a brace-providing direction. A cross-shaft 22 extends between the lugs 18 and pivotally connects the brace bars 19 for pivotal movement to and from an advanced brace-providing position and a retracted position. Cross-braces 23 span the brace-providing members 19 to reinforce the same. Each of the brace bars 19 is formed with a foot 24 which is adapted in the brace-providing position to rest flatly on the ground to provide a firm support.

The ramp according to the invention includes a lower section 25, which comprises a pair of spaced and parallel tubular members 26 which are telescopically-receivable in the tubular members 14 of the upper section 15. The lower ends of the tubular members 26 are connected together by an angle iron 27, one flange of which is rearwardly and upwardly directed below the members 26 and has a clevis 28 fixed thereto centrally thereof. A flexible member 29, such as a chain, has one end secured to the clevis 28 and has a hook 30 carried by the other end thereof. The hook 30 is, at times, adapted to be hooked over the shaft 22 whereby to limit movement of the lower section 25 in an extending direction. At other times, as will appear presently, the hook 30 and chain 29 comprise means for locking both sections 15 and 25 together with the brace 20 in the retracted position.

As shown in broken lines, Figure 1, and in full lines in Figure 4, to retract the ramp from the extended position of Figures 1, 2 and 4, the hook 30 is disconnected from the shaft 22 and the lower section 25 is telescoped upwardly into the upper section 15 in a well known manner. Thereafter, the brace 20 is swung upwardly on the shaft 22 until the bars 19 thereof lie parallel to the upper section-providing members 14. The chain 29 is now wound over the intersection of the cross-braces 23 of the brace 20, then outwardly over a rung 16, Figure 4, and then inwardly to maintain the parts in the retracted position. Now, the upper section 15 may be swung on its pivots to the broken line position, Figure 1, and the hook 30 may be hooked in the rearwardly-directed eye 31 carried by the rear surface of the plate 11. As clearly shown in Figure 4, with the parts in this position, the limit stop 17 abuts the plate 11 and provides sufficient space for the positioning of the feet 24 of the brace 20 between the plate 11 and the upper section 15.

With the parts in the retracted position, and the device applied to a vehicle, such as a truck, it is to be understood that the lower ends of the assembly are spaced a distance above the ground which is at least as great as the lowest fixed part of the vehicle itself. Thus, the vehicle is free to travel along the road without any danger of damage being done to the assembly by obstructions in the road. Also, with the parts in this position, the device provides a permanent ladder for entering and leaving the body of the vehicle. At the same time, when the vehicle is to be loaded or unloaded, the hook 30 is disengaged from the eye 31 and the parts unfolded to the extended ramp-providing position. Obviously, the upper section 15 will still function as a ladder to assist in entering and leaving the vehicle, while the extended ramp-providing members 26 and 14 permit goods from the platform 10 to be readily loaded or unloaded therefrom or thereto. The brace 20 supports the ramp at its weakest point, which is substantially intermediate the ends thereof, whereby to permit heavy loads to be passed over the ramp.

Thus, while we have shown and described what is now thought to be the preferred embodiment of our invention, it is to be understood that the same is susceptible of other forms and expressions. Consequently, we do not limit ourselves to the precise structure shown and described hereinabove, except as hereinafter claimed.

We claim:

1. A loading ramp for attachment to an end edge of a platform comprising a vertically disposed plate adapted to be positioned with one face thereof abutting the end edge of said platform and dependingly carried by said platform, a pair of spaced vertically disposed hollow tubular members facing toward and spaced from the other face of said plate and connected at their upper ends to said other face of said plate adjacent the upper edge thereof for swinging movement from the vertical position to an inclined position with respect to said plate, a plurality of spaced rungs extending between said pair of tubular members intermediate the ends of the latter and secured to said tubular members, stop members projecting from the portions of said tubular members facing said other face of said plate adjacent the upper ends of said members and engageable with said other face of said plate when the tubular members are in their vertical positions, fixed lugs projecting from the portions of said tubular members facing said other face of said plate adjacent the lower ends of said tubular members, an inverted vertically disposed brace bar positioned between each of said tubular members and said plate and having the lower end engageable with said other face of said plate and having the upper end pivotally connected to the lug of the adjacent tubular member for swinging movement from its inverted vertical position to a normal vertical position, a second pair of vertically disposed tubular members supported in said first pair of tubular members for extensile and contractile movement through the lower ends of the latter and having the lower ends normally projecting from the lower ends of said first pair of tubular members, an angle iron connecting the projecting lower ends of said second pair of tubular members together, and a flexible member having one end secured to said angle iron intermediate its ends and having means on the other end selectively engageable with one of said rungs to hold said inverted brace bars and first and second pairs of tubular members in their vertical positions and with the pivotal connection of said inverted brace bars to said lugs when said first pair of tubular members have been swung to the inclined position, said second pair of tubular members have executed their extensile movement, and said brace bars have executed their pivotal movement to the normal vertical position.

2. A loading ramp for attachment to an end edge of a platform comprising a vertically disposed plate adapted to be positioned with one face thereof abutting the end edge of said platform and dependingly carried by said platform, a pair of spaced ears projecting from the other face of said plate adjacent the upper end thereof, a pair of spaced vertically disposed hollow tubular members facing toward and spaced from the other face of said plate and hingedly connected at their upper ends to said ears for swinging movement from the vertical position to an inclined position with respect to said plate, a plurality of spaced rungs extending between said pair of tubular members intermediate the ends of the latter and secured to said tubular members, stop members projecting from the portions of said tubular members facing said other face of said plate adjacent the upper ends of said members and engageable with said other face of said plate when the tubular members are in their vertical positions, fixed lugs projecting from the portions of said tubular members facing said other face of said plate adjacent the lower ends of said tubular members, an inverted vertically disposed brace bar positioned between each of said tubular members and said plate and having the lower end provided with a foot engageable with said other face of said plate and having the upper end pivotally connected to the lug of the adjacent tubular member for swinging movement from its inverted vertical position to a normal vertical position, a second pair of vertically disposed tubular members supported in said first pair of tubular members for extensile and contractile movement through the lower ends of the latter and having the lower ends normally projecting from the lower ends of said first pair of tubular members, an angle iron connecting the projecting lower ends of said second pair of tubular members together, and a chain having one end secured to said angle iron intermediate its ends and having a hook on the other end selectively engageable with one of said rungs to hold said inverted brace bars and first and second pairs of tubular members in their vertical positions and with the pivotal connection of said inverted brace bars to said lugs when said first pair of tubular members have been swung to the inclined position, said second pair of tubular members have executed their extensile movement, and said brace bars have executed their pivotal movement to the normal vertical position.

DON R. BIGGERT.
HERBERT P. GOEDICKE.

REFERENCES CITED

The following references are of record in the file of this patent:

UNITED STATES PATENTS

| Number | Name | Date |
| --- | --- | --- |
| 460,196 | Chase | Sept. 29, 1891 |
| 963,918 | Miller | July 12, 1910 |
| 1,158,829 | Nicolaus | Nov. 2, 1915 |
| 1,201,790 | Allen | Oct. 17, 1916 |
| 1,293,083 | Golding | Feb. 4, 1919 |
| 1,357,607 | Behrens | Nov. 2, 1920 |
| 1,898,679 | Miller | Feb. 21, 1933 |